United States Patent
Zhu et al.

(10) Patent No.: US 11,869,528 B2
(45) Date of Patent: Jan. 9, 2024

(54) VOICE SIGNAL PROCESSING METHOD AND DEVICE, APPARATUS, AND READABLE STORAGE MEDIUM

(71) Applicant: SUZHOU KEDA TECHNOLOGY CO., LTD., Suzhou (CN)

(72) Inventors: Sainan Zhu, Suzhou (CN); Hongjie Pu, Suzhou (CN); Renxiang Yan, Suzhou (CN); Lijun Cao, Suzhou (CN)

(73) Assignee: SUZHOU KEDA TECHNOLOGY CO., LTD., Suzhou (CN)

( * ) Notice: Subject to any disclaimer, the term of this patent is extended or adjusted under 35 U.S.C. 154(b) by 179 days.

(21) Appl. No.: 17/438,640

(22) PCT Filed: Oct. 15, 2019

(86) PCT No.: PCT/CN2019/111319
§ 371 (c)(1),
(2) Date: Sep. 13, 2021

(87) PCT Pub. No.: WO2020/181766
PCT Pub. Date: Sep. 17, 2020

(65) Prior Publication Data
US 2022/0223166 A1    Jul. 14, 2022

(30) Foreign Application Priority Data
Mar. 14, 2019  (CN) .................. 201910195602.X (51) Int. Cl.
*G10L 21/0232* (2013.01)
*G10L 21/0264* (2013.01)
(Continued)

(52) U.S. Cl.
CPC ...... *G10L 21/0232* (2013.01); *G10L 21/0264* (2013.01); *G10L 21/034* (2013.01);
(Continued)

(58) Field of Classification Search
CPC ............. G10L 21/0232; G10L 21/0264; G10L 21/034; G10L 25/06; G10L 25/18;
(Continued)

(56) References Cited

U.S. PATENT DOCUMENTS

| 8,472,616 B1 | 6/2013 | Jiang |
| 9,916,840 B1 | 3/2018 | Do et al. |

(Continued)

FOREIGN PATENT DOCUMENTS

| CN | 104754157 A | 7/2015 |
| CN | 106657507 A | 5/2017 |
| WO | 2018188282 A1 | 10/2018 |

OTHER PUBLICATIONS

International Search Report issued in PCT application PCT/CN2019/111319, dated Jan. 22, 2022.
(Continued)

*Primary Examiner* — Sonia L Gay
(74) *Attorney, Agent, or Firm* — BENESCH, FRIEDLANDER, COPLAN & ARONOFF LLP (57) ABSTRACT

Provided is a voice signal processing method. The method comprises the following steps: acquiring a status coefficient, a target voice signal to be processed, and a derivative signal of the target voice signal (S101); using the derivative signal to respectively calculate an initial echo loss corresponding to each signal frame in the target voice signal, then using the status coefficient to adjust the initial echo loss to acquire a target echo loss (S102); using the derivative signal to calculate a proximal-distal coherence value of the target voice signal (S103); judging whether the target echo loss matches with a single-talk echo state (S104); if so, recording the proximal-distal coherence value in the status statistical data, and updating statistical information (S105); and using the statistical information to update the status coefficient, and performing volume control on the target voice signal
(Continued)

after the status coefficient is updated (S106). The method ensures better sound quality, and further improves user experience. Also provided are a voice signal processing device, an apparatus, and a readable storage medium, having corresponding technical effects.

9 Claims, 5 Drawing Sheets

(51) Int. Cl.
| | |
|---|---|
| *G10L 21/034* | (2013.01) |
| *G10L 25/06* | (2013.01) |
| *G10L 25/21* | (2013.01) |
| *G10L 21/0208* | (2013.01) |
| *H04M 3/56* | (2006.01) |
| *H04M 9/08* | (2006.01) |
| *G10L 25/18* | (2013.01) |

(52) U.S. Cl.
CPC .............. *G10L 25/06* (2013.01); *G10L 25/18* (2013.01); *G10L 25/21* (2013.01); *H04M 3/568* (2013.01); *H04M 9/082* (2013.01); *G10L 2021/02082* (2013.01)

(58) Field of Classification Search
CPC .......... G10L 25/21; G10L 2021/02082; H04M 3/568; H04M 9/082
See application file for complete search history.

(56) References Cited

U.S. PATENT DOCUMENTS 10,264,135 B2    4/2019   Zhou
2015/0350777 A1  12/2015  Yang et al.

OTHER PUBLICATIONS

Written Opinion of the International Searching Authority issued in PCT application PCT/CN2019/111319, dated Jan. 22, 2022.
First Office Action issued in Chinese Patent Application No. 01910195602X, dated May 28, 2020.
Extended European European Search Report issued in European Patent application No. 19918901.0, dated Mar. 31, 2022.

VOICE SIGNAL PROCESSING METHOD AND DEVICE, APPARATUS, AND READABLE STORAGE MEDIUM

TECHNICAL FIELD

The present application relates to the field of communication technology, and in particular to a voice signal processing method and device, apparatus, and readable storage medium.

BACKGROUND

In VOIP applications (such as software video conferences, VOIP teleconferences, etc.), echo cancellation plays a vital role, and its performance directly affects the quality of user conference calls. In theory, the echo is formed by the target sound after the impulse response of the room channel, therefore, the echo channel can be simulated by the adaptive filter to achieve the effect of echo cancellation. However, in actual conference call scenarios, there are often various problems such as the limitation of adaptive filtering convergence, the nonlinear distortion of the speaker, the environmental background noise, and the delay jitter.

The current echo cancellation technology generally uses a method of cascading a residual echo suppressor behind a linear echo canceler to achieve the effect of echo cancellation. The most commonly used method to realize residual echo estimation is to use the estimated echo and leakage factor output from the adaptive filter to realize the residual echo estimation, so as to realize the suppression of the residual echo. This method can get a better residual echo estimation only when the acoustic environment is good and the filter converges. However, in the actual complex environment, it is difficult for the filter to converge in the true sense, and it is often estimated that the echo is too small, which leads to the residual echo estimation is too small, so there is a problem of slight echo leakage. In addition, in order to ensure the quality of the interactive sound in the meeting, a dynamic range controller is often cascaded behind the residual echo suppressor to ensure a stable sound volume. The commonly used dynamic range controller only determines the presence or absence of voice based on the magnitude of the sound amplitude, so as to track the sound envelope and adjust the volume gain. However, in the case of a single-talk with poor pre-echo cancellation and echo leakage, the dynamic range controller at this time still recognizes that there is voice and performs the wrong tracking of the envelope, which causes the volume gain adjustment to rapidly increase or decrease, thereby causes a series of low sound quality problems such as the increase of the echo, the sudden amplification of the subsequent normal local sound or the sudden reduction of the subsequent normal local sound and the like.

In summary, how to effectively improve the quality of voice signal processing and other issues are technical problems that need to be solved urgently by those skilled in the art.

SUMMARY OF THE INVENTION

The purpose of the present application is to provide a voice signal processing method and device, apparatus, and readable storage medium to improve the quality of voice signal processing.

In order to solve the above technical problems, the present application provides the following technical solutions:

a voice signal processing method, comprising:
 acquiring a status coefficient, a target voice signal to be processed, and a derivative signal of the target voice signal;
 using the derivative signal to respectively calculate an initial echo loss corresponding to each signal frame in the target voice signal, and using the status coefficient to adjust the initial echo loss to acquire a target echo loss;
 using the derivative signal to calculate a proximal-distal coherence value of the target voice signal;
 judging whether the target echo loss matches with a single-talk echo state;
 if the target echo loss matches with a single-talk echo state, recording the proximal-distal coherence value in status statistical data, and updating statistical information;
 using the statistical information to update the status coefficient, and performing volume control on the target voice signal when updating the status coefficient.

Preferably, the derivative signal comprises a residual signal, an estimated echo signal, a distal reference signal and a proximal signal; using the derivative signal to respectively calculate an initial echo loss corresponding to each signal frame in the target voice signal comprises:
 converting the derivative signal into a frequency domain signal, and calculating an autocorrelation power spectrum; wherein, the frequency domain signal comprises a residual frequency domain signal, estimated echo frequency domain signal, distal reference frequency domain signal and proximal frequency domain signal, the autocorrelation power spectrum comprises residual signal autocorrelation power spectrum, estimated echo signal autocorrelation power spectrum and distal reference signal autocorrelation power spectrum;
 calculating the initial echo loss, according to the frequency domain signal and the autocorrelation power spectrum.

Preferably, using the frequency domain signal and the autocorrelation power spectrum to calculate the initial echo loss comprises:
 performing unary linear regression analysis on the residual signal and the estimated echo signal to obtain a leakage coefficient of each signal frame in the target voice signal;
 judging an estimated residual echo value, according to a preset correspondence relationship between the leakage coefficient and the signal autocorrelation power spectrum, in combination with the signal autocorrelation power spectrum;
 using a residual echo suppression function to suppress a residual echo to obtain a residual echo suppression signal;
 using the residual echo suppression signal and the proximal signal to determine the initial echo loss corresponding to each signal frame in the target voice signal.

Preferably, using the derivative signal to calculate a proximal-distal coherence value of the target voice signal comprises:
 in a human voice frequency range, using the frequency domain signal to calculate the proximal-distal coherence value.

Preferably, judging whether the target echo loss matches with a single-talk echo state comprises:

judging whether the target echo loss is less than a preset threshold;

if the target echo loss is less than a preset threshold, judging the target echo loss matches the single-talk echo state;

if the target echo loss is not less than a preset threshold, judging the target echo loss does not match the single-talk echo state.

Preferably, when the status statistical data is stored in the form of a statistical histogram, using the statistical information to update the status coefficient comprises:

when a statistical amount in the statistical information is greater than a preset statistical threshold, obtaining a median value of the statistical histogram;

using the median value to recalculate the status coefficient, and using a calculation result to update the status coefficient.

Preferably, performing volume control on the target voice signal when the status coefficient is updated comprises:

calculating a transient envelope value of the target voice signal when updating the status coefficient;

updating an envelope when the transient envelope value is greater than a preset noise threshold;

using an updated envelope to calculate a decibel value to obtain a decibel calculation result;

according to a mapping relationship between decibel and gain, judging a gain value matching the decibel calculation result, and using the gain value to control volume of the target voice signal.

A voice signal processing device, comprising:

a signal acquisition module, configured to acquire a status coefficient, a target voice signal to be processed, and a derivative signal of the target voice signal;

a target echo loss acquisition module, configured to use the derivative signal to respectively calculate an initial echo loss corresponding to each signal frame in the target voice signal, and use the status coefficient to adjust the initial echo loss to acquire a target echo loss;

a proximal-distal coherence value calculation module, configured to use the derivative signal to calculate a proximal-distal coherence value of the target voice signal;

a judging module, configured to judge whether the target echo loss matches with a single-talk echo state;

a proximal-distal coherence value recording module, configured to record the proximal-distal coherence value in status statistical data, and update statistical information, when the target echo loss matches with a single-talk echo state;

a volume control module, configured to use the statistical information to update the status coefficient, and perform volume control on the target voice signal when updating the status coefficient.

A voice signal processing apparatus, comprising:

a memory, configured to store a computer program;

a processor, configured to perform the steps of the above voice signal processing method when the computer program is executed.

A readable storage medium, a computer program is stored on the readable storage medium, and when the computer program is executed by a processor, the above voice signal processing method is performed.

Apply the method provided in the embodiments of this application to acquire a status coefficient, a target voice signal to be processed, and a derivative signal of the target voice signal; use the derivative signal to respectively calculate an initial echo loss corresponding to each signal frame in the target voice signal, and use the status coefficient to adjust the initial echo loss to acquire a target echo loss; use the derivative signal to calculate a proximal-distal coherence value of the target voice signal; judge whether the target echo loss matches with a single-talk echo state; if the target echo loss matches with a single-talk echo state, record the proximal-distal coherence value in status statistical data, and update statistical information; use the statistical information to update the status coefficient, and perform volume control on the target voice signal when updating the status coefficient.

After acquiring a status coefficient, a target voice signal to be processed, and a derivative signal of the target voice signal, the derivative signal can be used to respectively calculate an initial echo loss corresponding to each signal frame in the target voice signal. Then, use the status coefficient to adjust the initial echo loss to acquire a target echo loss. In order to avoid the erroneous belief that there is voice and perform the wrong tracking of the envelope in the case of single-talk echo, which further causes the volume gain adjustment to rapidly increase or decrease, thereby causes a series of low sound quality problems such as the increase of the echo, the sudden amplification or the sudden decrease of the subsequent normal local sound and the like. After judging the target echo loss and calculating the proximal-distal coherence value, it can be judged whether the target echo loss matches with a single-talk echo state. If it matches, record it in the status statistics and update the statistics, if it matches, recording in status statistical data, and updating statistical information. Then using the statistical information to update the status coefficient, and performing volume control on the target voice signal when updating the status coefficient.

Compared with the prior art, this method has the advantages of high environmental applicability, strong echo suppression ability, and high sound quality. Among them, the high environmental applicability, that is, no matter how complex and changeable the objective factors such as reverberation, noise, and nonlinear distortion are in the conference environment, using the status statistical data to update the status coefficient does not need to be limited by the theoretical values, and can more adaptively reflect the similarity of the proximal and distal signals in the case of a single-talk in the current environment; the high sound quality, that is, the volume control of the target voice signal is performed when the status coefficient is updated, which can avoid the wrong tracking of the loudness envelope and the wrong adjustment of the gain when the echo is not cleared (the residual echo is slight or large) in the case of a single-talk, and the sound quality can be improved. That is to say, the method provided by the embodiment of the present application can improve the signal quality of the target voice signal after processing the target voice signal, can ensure the sound quality when the target voice signal is played, and can further improve the user experience.

Correspondingly, the embodiments of the present application also provide a voice signal processing device, an apparatus, and a readable storage medium corresponding to the aforementioned voice signal processing method, which have the aforementioned technical effects, and will not be repeated here.

BRIEF DESCRIPTION OF THE DRAWINGS

In order to more clearly illustrate the technical solutions in the embodiments of the present application or in the prior art, the accompanying drawings used in describing the embodiments or the prior art will be briefly introduced below, and apparently, the accompanying drawings mentioned in the following description are just some embodiments of the present application, and other drawings can be derived by a person skilled in the art from these drawings without expenditure of creative efforts.

DETAILED DESCRIPTION OF EMBODIMENTS

In order to enable those skilled in the art to better understand the solution of the present application, the application will be further described in detail below in conjunction with the accompanying drawings and specific embodiments. Apparently, the described embodiments are only a part of, but not all of, the embodiments of the present application. All other embodiments obtained by a person skilled in the art based on the embodiments described in the present application without expenditure of creative efforts belong to the protection scope of the present application.

Embodiment 1

Figure 1:
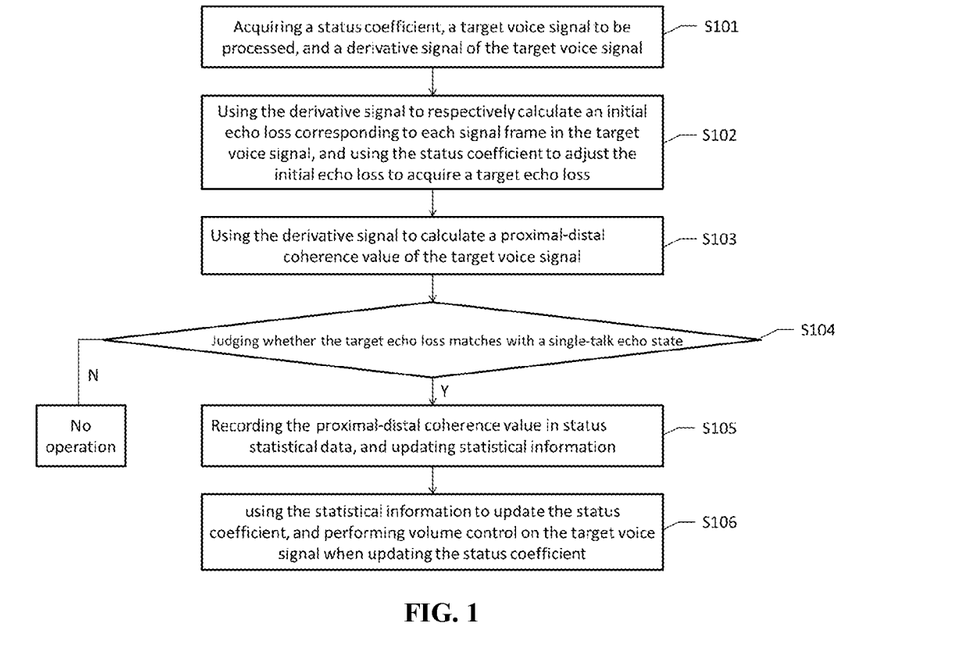
FIG. 1 is an implementation flowchart of a voice signal processing method in an embodiment of the present application.

Referring to FIG. 1, which is an implementation flowchart of a voice signal processing method in an embodiment of the present application, the method comprises the following steps:

S101: acquiring a status coefficient, a target voice signal to be processed, and a derivative signal of the target voice signal.

It should be noted that, in the embodiments of the present application, the processed target voice signal can be a signal acquired by using an adaptive filter to perform echo cancellation processing on the original voice signal, and the derivative signal of the target voice can comprise a residual signal, an estimated echo signal, a distal reference signal and a proximal signal. For ease of description, in the present text, $e(n)$ represents the residual signal, $y(n)$ represents the estimated echo signal, $x(n)$ represents the distal reference signal, and $d(n)$ represents the proximal signal. In addition, the status coefficient is the coefficient that characterizes the status conditions of the target voice signal, which can be acquired from the preamble voice signal processing process, the status coefficient is adjusted according to the specific signal status of the target voice signal processed, and the detailed adjustment process can be found in the update process of the status coefficient below.

S102: using the derivative signal to respectively calculate an initial echo loss corresponding to each signal frame in the target voice signal, and using the status coefficient to adjust the initial echo loss to acquire a target echo loss.

After acquiring the status coefficient, the target voice signal, and the derivative signal of the target voice signal, the derivative signal can be used to respectively calculate an initial echo loss corresponding to each signal frame in the target voice signal. In order to improve the accuracy of the echo loss, the status coefficient can be used to adjust the initial echo signal to obtain a more accurate target echo loss.

Wherein the process of using the derivative signal to respectively calculate an initial echo loss corresponding to each signal frame in the target voice signal comprises:

Step 1: converting the derivative signal into a frequency domain signal, and calculating an autocorrelation power spectrum; wherein, the frequency domain signal comprises a residual frequency domain signal, estimated echo frequency domain signal, distal reference frequency domain signal and proximal frequency domain signal, the autocorrelation power spectrum comprises residual signal autocorrelation power spectrum, estimated echo signal autocorrelation power spectrum and distal reference signal autocorrelation power spectrum;

Step 2: calculating the initial echo loss, according to the frequency domain signal and the autocorrelation power spectrum.

For ease of description, the above two steps are combined for description below.

Specifically, the conversion of a derivative signal in the time domain into a frequency domain signal can be achieved by Fourier transform, for the specific transformation process, referring to the realization process of Fourier transform, which will not be repeated here. Since the derivative signal comprises a residual signal, an estimated echo signal, a distal reference signal and a proximal signal, the frequency domain signal acquired after the signal transformation comprises a residual frequency domain signal, estimated echo frequency domain signal, distal reference frequency domain signal and proximal frequency domain signal. For ease of description, in the present text, $e(w)$ represents the residual frequency domain signal, $Y(w)$ represents the estimated echo frequency domain signal, $X(w)$ represents the distal reference frequency domain signal, and $D(w)$ represents the proximal frequency domain signal. After acquiring the frequency domain signal, the frequency domain signal can be used to calculate the autocorrelation power spectrum of various constituent signals in the target voice signal. Specifically, residual signal autocorrelation power spectrum $S_{EE}(w)$, estimated echo signal autocorrelation power spectrum $S_{YY}(w)$ and distal reference signal autocorrelation power spectrum $S_{XX}(w)$ can be calculated.

Wherein calculating the initial echo loss, according to the frequency domain signal and the autocorrelation power spectrum comprises:

Step 1: performing unary linear regression analysis on the residual signal and the estimated echo signal to obtain a leakage coefficient of each signal frame in the target voice signal;

Step 2: judging an estimated residual echo value according to a correspondence relationship between the preset leakage coefficient and the signal autocorrelation power spectrum, in combination with the signal autocorrelation power spectrum;

Step 3: using a residual echo suppression function to suppress a residual echo to obtain a residual echo suppression signal;

Step 4: using the residual echo suppression signal and the proximal signal to determine the initial echo loss corresponding to each signal frame in the target voice signal.

For ease of description, the above four steps are combined for description below:

Calculating the leakage coefficient Leak(l) of the residual echo of the current frame (the lth frame), which reflects the degree of leakage of the echo relative to the distal signal, and is obtained by unary linear regression analysis of the residual signal e(n) and the estimated echo y(n), the expression of which is $$\text{Leak}(l) = \frac{\Sigma R_{EY}(l, w)}{\Sigma R_{YY}(l, w)},$$

wherein, $R_{EY}(l,w)$ is the frequency domain mutual coherence value obtained by the recursive average of the residual signal and the estimated echo signal, $R_{YY}(l,w)$ is the autocorrelation value obtained by estimating the recursive average of the echo signal, and their expressions are $R_{EY}(l,w)=(1-\beta)*R_{EY}(l-1,w)+\beta*E(w)*Y(w), R_{YY}(l,w)= (1-\beta)*R_{YY}(l-1,w)+\beta*S_{YY}(w),$ wherein, $R_{EY}(0,w)=1$, $R_{EY}(0,w)=1$, $\beta$ is the smoothing coefficient (The value range of $\beta$ is in the range of 0-1, such as 0.93).

Then, according to a preset correspondence relationship between the leakage coefficient and the signal autocorrelation power spectrum, calculating the residual echo estimated value REcho(w): when the leakage factor Leak is greater than 0.5, the residual echo estimated value REcho(w)=$S_{YY}$(w), otherwise REcho(w)=$2*S_{YY}$(w). Preferably, when the system becomes stable, the status coefficient can be used for fine-tuning to further obtain the residual echo estimated value: REcho(w)=REcho(w)*Ralpha(w), wherein, Ralpha (w) is the status coefficient.

Wherein, the residual echo suppression function is $$H(w) = \sqrt{\frac{S_{EE}(w) - REcho(w)}{S_{EE}(w)}},$$

$S_{EE}$(w) is the residual signal autocorrelation power spectrum, $S_{YY}$(w) is the estimated echo signal autocorrelation power spectrum, and REcho(w) is the residual echo estimated value. Using the residual echo suppression function to suppress a residual echo to obtain the signal e2(n) output by the residual echo suppressor.

Then, calculating the target echo loss ERLE:

$$ERLE = 10*\log10\left(\frac{\sum_{n=0}^{N} e2(n)*e2(n)}{\sum_{n=0}^{N} d(n)*d(n)}\right),$$

wherein, N is the frame length.

It should be noted that the above method of calculating echo loss is only an optional embodiment listed in the present application, and for those skilled in the art, it can be calculated in a manner related to or similar to the above method, for example, modify and increase the weight coefficient of related parameters, increase the error offset, and so on. The calculation of the coherence value, the transient envelope value, the power, etc. described in the embodiments of the present application are all aligned, and they are only an optional calculation method, and are not improperly limited.

S103: using the derivative signal to calculate a proximal-distal coherence value of the target voice signal.

Specifically, after the distal reference signal and the proximal signal in the derivative signal are converted into frequency domain signals, the distal reference frequency domain signal and the proximal frequency domain signal can be used to calculate the proximal-distal coherence value of the target voice signal.

Preferably, since the main voice source of the target voice signal processed by the embodiment of the present application is the human voice converted by the sound sensor, in order to reduce other noise interference, the frequency domain signal can be used to calculate the proximal-distal coherence value within the human voice frequency range when calculating the proximal-distal coherence value. Wherein, the human voice frequency range is (300 Hz~3000 Hz), that is to say, when the proximal-distal coherence value is calculated, the frequency search range is (300 Hz~3000 Hz).

S104: judging whether the target echo loss matches with a single-talk echo state.

In the embodiment of the present application, a judgment threshold for judging whether the target echo loss matches with a single-talk echo state matching can be preset, that is, the preset threshold $T_{erle}$. (According to the ITU G.167 standard, the $T_{erle}$ value here is recommended to be 40 dB) The specific determination process comprises:

Step 1: judging whether the target echo loss is less than a preset threshold;

Step 2: if the target echo loss is less than a preset threshold, judging the target echo loss matches the single-talk echo state;

Step 3: if the target echo loss is not less than a preset threshold, judging the target echo loss does not match the single-talk echo state.

For ease of description, the above three steps are combined for description below:

When the echo loss ERLR<$T_{erle}$ value, it is preliminarily determined to be the single-talk echo state, and the operation of step S105 is executed; otherwise, no processing is required, that is, no operation is required.

S105: recording the proximal-distal coherence value in status statistical data, and updating statistical information.

After the proximal-distal coherence value is calculated, and when the target echo loss matches with a single-talk echo state, the calculated proximal-distal coherence value is recorded in the status statistical data. In order to facilitate statistics, the status statistical data can be stored in the form of a status statistical histogram. Of course, in other embodiments of the present application, the status statistical data can also be stored in a common data statistical form such as a table or a sequence. Wherein, the statistical information may comprise the statistical amount and statistical time of the recorded proximal-distal coherence value.

S106: using the statistical information to update the status coefficient, and performing volume control on the target voice signal when updating the status coefficient.

Since the statistical information is a further statistical result of the status statistical data that meets the proximal-distal coherence value in the single-talk echo state, the state of the target voice signal can be known according to the statistical information, that is, statistical information can be used to update the status coefficient. Specifically, when the status statistical data is stored in the form of a statistical histogram, the median value of the statistical histogram can be obtained when the statistical amount in the statistical information is greater than a preset statistical threshold. Using the median value to recalculate the status coefficient, and using a calculation result to update the status coefficient. Calculating the status coefficient based on the median value without being limited by the theoretical values, can better reflect the state of the target voice signal.

Specifically, a transient envelope value of the target voice signal is calculated when updating the status coefficient; an envelope is updated when the transient envelope value is greater than a preset noise threshold; an updated envelope is used to calculate a decibel value to obtain a decibel calculation result; according to a mapping relationship between decibel and gain, a gain value matching with the decibel calculation result is determined, and the gain value is used to control volume of the target voice signal. Wherein, the specific calculation process of the transient envelope value is to calculate the energy average value of the target voice signal. The envelope line is a curve reflecting the change of the signal amplitude, and the value corresponding to each point on the envelope line can be regarded as the transient envelope value. After obtaining the transient envelope value, it can be judged whether to update the envelope by judging whether the transient envelope value is greater than the preset noise threshold. That is, when the transient envelope value is greater than the preset threshold, it is deemed that there is voice, and the envelope can be updated at this time. Then, the closed calculation is performed on the updated envelope, and finally the gain value is determined based on the decibel value. In this way, the gain control can be performed on the target voice signal, that is, the volume of the voice signal can be controlled.

By applying the method provided in the embodiments of this application, a status coefficient, a target voice signal to be processed, and a derivative signal of the target voice signal can be acquired; the derivative signal is used to respectively calculate an initial echo loss corresponding to each signal frame in the target voice signal, and the status coefficient is used to adjust the initial echo loss to acquire a target echo loss; the derivative signal is used to calculate a proximal-distal coherence value of the target voice signal; whether the target echo loss matches with a single-talk echo state is judged; if the target echo loss matches with a single-talk echo state, the proximal-distal coherence value is recorded in status statistical data, and the statistical information is updated; the statistical information is used to update the status coefficient, and the volume control is performed on the target voice signal when the status coefficient is updated.

After acquiring a status coefficient, a target voice signal to be processed, and a derivative signal of the target voice signal, the derivative signal can be used to respectively calculate an initial echo loss corresponding to each signal frame in the target voice signal. Then, the status coefficient is used to adjust the initial echo loss to acquire a target echo loss. In order to avoid the erroneous belief that there is voice and perform the wrong tracking of the envelope in the case of single-talk echo, which further causes the volume gain adjustment to rapidly increase or decrease, thereby causing a series of low sound quality problems such as the increase of the echo, the sudden amplification or the sudden decrease of the subsequent normal local sound and the like. After judging the target echo loss and calculating the proximal-distal coherence value, it can be judged whether the target echo loss matches with a single-talk echo state. If it matches, a record is made in status statistical data, and the statistical information is updated. Then, the statistical information is used to update the status coefficient, and the volume control is performed on the target voice signal when the status coefficient is updated.

Compared with the prior art, this method has the advantages of high environmental applicability, strong echo suppression ability, and high sound quality. Among them, the high environmental applicability, that is, no matter how complex and changeable the objective factors such as reverberation, noise, and nonlinear distortion are in the conference environment, using the status statistical data to update the status coefficient does not need to be limited by the theoretical values, and can more adaptively reflect the similarity of the proximal and distal signals in the case of a single-talk in the current environment; the high sound quality, that is, the volume control of the target voice signal is performed when the status coefficient is updated, which can avoid the wrong tracking of the loudness envelope and the wrong adjustment of the gain when the echo is not cleared (the residual echo is slight or large) in the case of a single-talk, and the sound quality can be improved. That is to say, the method provided by the embodiment of the present application can improve the signal quality of the target voice signal after processing the target voice signal, can ensure the sound quality when the target voice signal is played, and can further improve the user experience.

Embodiment 2

In order to facilitate those skilled in the art to better understand the voice signal processing method provided by the embodiments of the present application, after simulating the functions implemented by the foregoing steps as corresponding devices, the voice signal processing method provided in the embodiments of the present application will be described in detail below.

Figure 2:
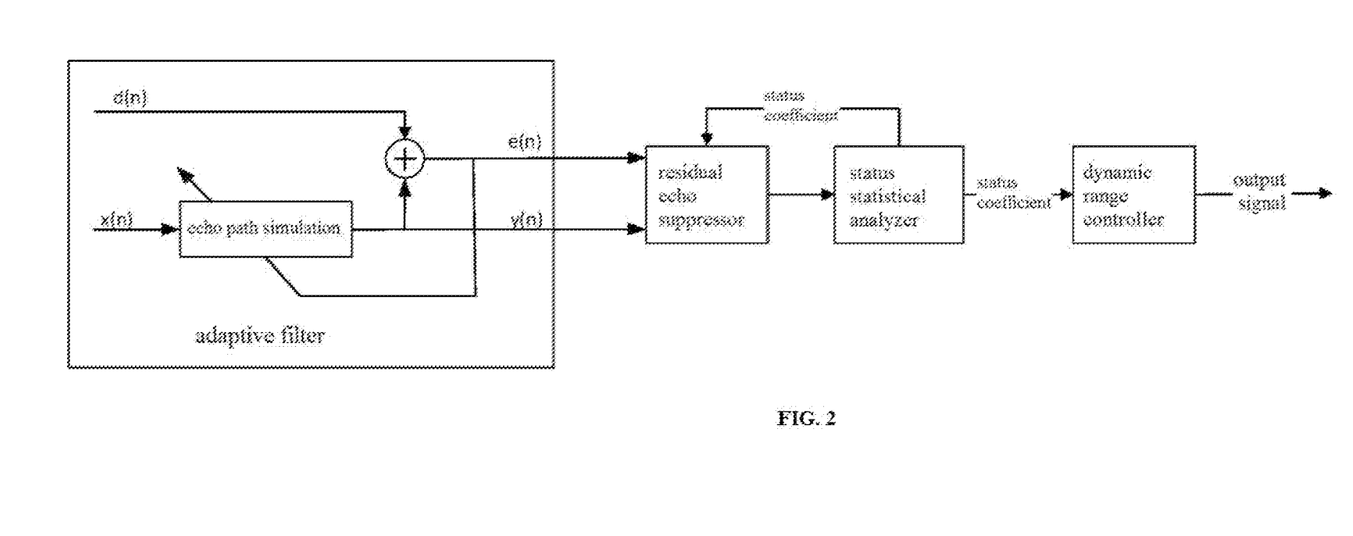
FIG. 2 is a technical block diagram of a voice signal processing method in an embodiment of the present application.

Referring to FIG. 2, which is a technical block diagram of a voice signal processing method in an embodiment of the present application. It can be seen that the voice signal processing method provided by the present application can be composed of three parts: residual echo suppressor, status statistical analyzer and dynamic range controller, wherein, the status coefficient is used as an output of the status statistical analyzer, which feedbacks and adjusts the estimation of the echo in the residual echo suppressor, and at the same time, is used as a judgment basis to the loudness tracking of the dynamic range controller.

Figure 3:
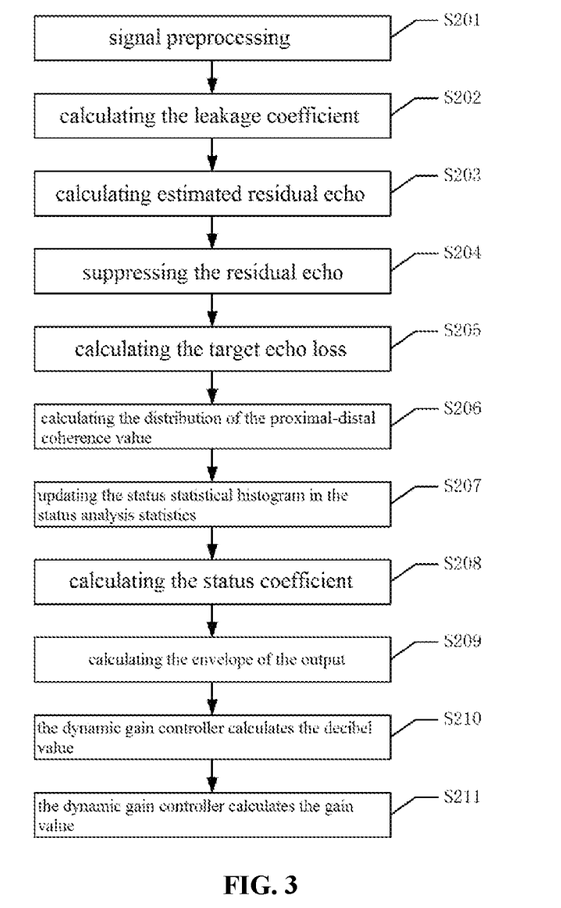
FIG. 3 is a specific implementation flowchart of a voice signal processing method in an embodiment of the present application.

Referring to FIG. 2, which is a specific implementation flowchart of a voice signal processing method in an embodiment of the present application. The specific implementation process of this method comprises:

S201: signal preprocessing: the residual echo suppressor obtains the residual signal e(n), the estimated echo signal y(n), the distal reference signal x(n) and the proximal signal d(n) of the adaptive filter, and performs Fourier transform respectively to obtain the residual signal frequency domain signal e(w), the estimated echo frequency domain signal Y(w), the distal reference frequency domain signal X(w) and proximal frequency domain signal D(w). At the same time, the residual signal autocorrelation power spectrum $S_{EE}(w)$, estimated echo signal autocorrelation power spectrum $S_{YY}(w)$ and distal reference signal autocorrelation power spectrum $S_{XX}(w)$ are calculated separately;

S202: calculating the leakage coefficient: the leakage coefficient Leak(l) of the residual echo of the current frame (the lth frame) is calculated, which reflects the degree of leakage of the echo relative to the distal signal, and is obtained by unary linear regression analysis of the residual signal e(n) and the estimated echo y(n), the expression of which is $$\text{Leak}(l) = \frac{\Sigma R_{EY}(l, w)}{\Sigma R_{YY}(l, w)},$$

wherein, $R_{EY}(l,w)$ is the frequency domain mutual coherence value obtained by the recursive average of the residual signal and the estimated echo signal, $R_{YY}(l,w)$ is the autocorrelation value obtained by estimating the recursive average of the echo signal, and their expressions are $R_{EY}(l,w)=(1-\beta)*R_{EY}(l-1,w)+\beta*E(w)*Y(w), R_{YY}(l,w)=$
$(1-\beta)R_{YY}(l-1,w)+\beta*S_{YY}(w),$ wherein, $R_{EY}(0,w)=1$, $R_{EY}(0,w)=1$, $\beta$ is the smoothing coefficient, which is 0.93.

S203: calculating estimated residual echo: that is, the estimated residual echo value REcho(w) is calculated, when the leakage factor Leak is greater than 0.5, the estimated residual echo value REcho(w)=$S_{YY}(w)$, otherwise REcho(w)=2*$S_{YY}(w)$. Here, if the statistical number of statistical histograms exceeds $T_N$ frames, when the system becomes stable: the status coefficients fed back by the status statistical analyzer are used for fine-tuning to further obtain the residual echo estimated value: REcho(w)=REcho(w)*Ralpha(w), wherein, Ralpha(w) is the status coefficient fed back by the status statistical analyzer;

S204: suppressing the residual echo: the residual echo suppression function $$H(w) = \sqrt{\frac{S_{EE}(w) - REcho(w)}{S_{EE}(w)}}$$

is used for suppressing the echo to obtain the signal e2(n) output by the residual echo suppressor.

S205: calculating the target echo loss: using $$ERLE = 10 * \log 10 \left( \frac{\sum_{n=0}^{N} e2(n) * e2(n)}{\sum_{n=0}^{N} d(n) * d(n)} \right)$$

to calculate the target echo loss, wherein, N is the frame length.

S206: calculating the distribution of the proximal-distal coherence value: the proximal-distal coherence average value is $$C_{XD} = \left( \sum_{w=startbin}^{endbin} \frac{S_{XD}(w)}{S_X(w) * S_D(w)} \right) / (endbin - startbin + 1),$$

wherein, the frequency search range corresponding to startbin and endbin is 300 Hz~3000 Hz respectively, this frequency range is the main frequency range of the speaker's voice. The calculation methods of $S_{XD}(w)$, $S_X(w)$ and $S_D(w)$ are as follows: $S_{XD}(W)$=gcoh*$S_{XD}(w)$+(1−gcoh)*X(w)*D(w); $S_X(W)$=gcoh*$S_X(w)$+(1−gcoh)*X(w)*X(w); $S_D(W)$=gcoh*$S_D(w)$+(1−gcoh)*D(w)*D(w), wherein gcoh is the forgetting factor, which is 0.93 here.

S207: updating the status statistical histogram in the status analysis statistics: when the target echo loss ERLR<$T_{erle}$ value (According to the ITU G.167 standard, the $T_{erle}$ value here is recommended to be 40 dB), it is preliminarily determined to be the single-talk echo state, the current $C_{XD}$ will be added to the status statistical histogram to update, and at the same time, the statistical number of the status statistical histogram will be added by one; otherwise, the histogram statistics will not be added.

S208: calculating the status coefficient: if the statistical number of the status statistical histogram is greater than $T_N$, then the median value $T_{XD}$ of the histogram statistics is obtained. Here, calculating the status coefficient $$Ralpha(w) = \frac{\frac{S_{XD}(w)}{S_D(w)*S_X(w)} * alpha + C_{XD} * (1 - alpha)}{T_{XD}},$$

wherein alpha is the weight coefficient, the value range is 0~1, which is recommended to be 0.5, and this value can also be fine-tuned according to the environment and the reliability of the calculation factor. At the same time, the range of the status coefficient is controlled between 0 and $$\frac{S_{DD}(k)}{S_{YY}(k)}.$$

If the statistical number of the histogram is greater than $T_N$, the status coefficient is fed back to the residual echo suppressor and the dynamic range controller.

S209: calculating the envelope of the output voice: the transient envelope value of the current target voice signal is $$Evenloptemp = \left( \sum_{i=1}^{N} e2(n) * e2(n) \right) / N,$$

when EvenlopTemp>$T_{noise}$, it is considered that there is voice in the current state, considering that the noise is generally distributed below −60 dB, here $T_{noise}$ is taken as 0.000001. In the presence of the voice signal, if and only in these two cases (the statistical number of histogram is less than $T_N$, the statistical number of the histogram is greater than $T_N$ and $C_{XD}$<(0.75*$T_{XD}$), wherein the value of 0.75 in the inequality is mainly set due to the value above the average value is more reliable. Of course, this value can also be selected between 0 and 1), the envelope update is performed:

Evenlop=factor*Evenlop+(1−factor)*EvenlopTemp,
wherein factor is the forgetting coefficient, which is 0.5; otherwise, no envelope update is performed.

S210: the dynamic gain controller calculates the decibel value: calculating the decibel value corresponding to the current frame of voice can be expressed as:

EvenlopdB(l)=10*$\log_{10}$(Evenlop). Smoothing the signal, if EvenlopdB(l)>EvenlopdB(l−1), the second smoothing value EvenlopdBSmooth of the signal can be expressed as: EvenlopdBSmooth=EvenlopdBSmooth*attact+(1−attact)*EvenlopdB(l), wherein attact is the start-up time coefficient, and the value range is between 0 and 1, for example, 0.933 can be taken; if EvenlopdB(l)<EvenlopdB(l−1), the second smoothing value EvenlopdBSmooth of the signal can be expressed as: EvenlopdBSmooth=EvenlopdBSmooth*release+(1−release)*EvenlopdB(l), wherein release is the release time coefficient, and the value range is between 0 and 1, for example, 0.966 can be taken.

S211: the dynamic gain controller calculates the gain value: the gain function of the dynamic gain control can be expressed as:

$$g = 10^{\frac{G_{Target} - EvenlopdBSmooth}{20}},$$

wherein $G_{Target}$ is the target decibel value, according to the normal volume distribution of the speaker, it is recommended to take −30 dB here. In order to avoid glitches in the gain value, smooth the gain value $g_{out}=g_{out}*\beta+g*(1-\beta)$, wherein the value range of β is between 0 and 1, such as 0.93, so as to output after gain adjustment.

It can be seen that the voice signal processing method provided by the present application is a processing method after echo cancellation based on statistical feedback, which is composed of three parts: residual echo suppressor, status statistical analyzer and dynamic range controller. Wherein the status statistical analyzer calculates the echo loss ERLE in real time based on the residual signal e(n) output by the residual echo suppressor and the proximal signal d(n), and analyzes the average value Cxd of the proximal mutual coherence between 300 Hz and 3000 Hz (The main frequency range of human voice, which is helpful to reduce noise interference) in real time. In different complex environments, due to the existence of factors such as reverberation, noise, nonlinear distortion, etc., the proximal-distal cross-correlation value is often not theoretically 1 in the case of purely single-talk. Therefore, when ERLE is less than the critical value $T_{erle}$, it is regarded as a single-talk scene (matching the single-talk echo state), and the Cxd at this time is added to the status statistical histogram for statistics, so as to determine the approximate distribution of the proximal-distal cross-correlation value in the single-talk environment.

When the statistical number of statistical histograms exceeds the $T_N$ frames, and when it is deemed to be stable, the mutual coherence value Txd corresponding to the median value position of the statistical value is taken in real time. From a mapping relationship between the mutual coherence average value Cxd and Txd at the current moment, the possibility of the current echo is determined, thus, the status coefficient is calculated, and the status coefficient is fed back to the residual echo suppressor of the previous stage, which is used as a basis for the estimation of residual echo, thereby avoiding the underestimation of the residual echo and avoiding the leakage of the echo; in addition, the status coefficient is output to the dynamic range controller, when the status coefficient value is greater than the threshold $T_{thre}$, the envelope tracking is not performed even though the voice is detected, it is considered that the echo contained in the voice at this moment will greatly affect the envelope tracking, and the instantaneous gain value still takes the value of the previous state, therefore, the problems of low interactive sound quality such as the amplification of echo and the sudden amplification of local voice or the sudden reduction of local voice are avoided.

Embodiment 3

Corresponding to the above method embodiments, the embodiments of the present application also provide a voice signal processing device. The voice signal processing device described below and the voice signal processing method described above can be referred to each other.

Figure 4:
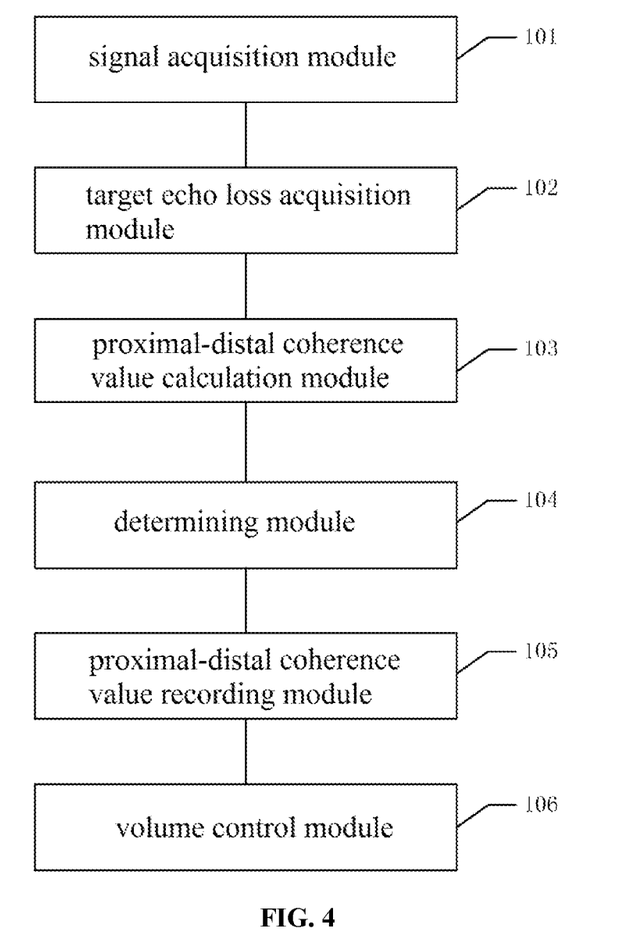
FIG. 4 is a schematic structural diagram of a voice signal processing device in an embodiment of the present application.

As shown in FIG. 4, the device comprises the following modules:

a signal acquisition module 101, configured to acquire a status coefficient, a target voice signal to be processed, and a derivative signal of the target voice signal;

a target echo loss acquisition module 102, configured to use the derivative signal to respectively calculate an initial echo loss corresponding to each signal frame in the target voice signal, and use the status coefficient to adjust the initial echo loss to acquire a target echo loss;

a proximal-distal coherence value calculation module 103, configured to use the derivative signal to calculate a proximal-distal coherence value of the target voice signal;

a judging module 104, configured to judge whether the target echo loss matches with a single-talk echo state;

a proximal-distal coherence value recording module 105, configured to record the proximal-distal coherence value in status statistical data, and update statistical information, when the target echo loss matches with a single-talk echo state;

a volume control module 106, configured to use the statistical information to update the status coefficient, and perform volume control on the target voice signal when updating the status coefficient is updated.

By applying the method provided in the embodiments of this application, a status coefficient, a target voice signal to be processed, and a derivative signal of the target voice signal can be acquired; the derivative signal is used to respectively calculate an initial echo loss corresponding to each signal frame in the target voice signal, and the status coefficient is used to adjust the initial echo loss to acquire a target echo loss; the derivative signal is used to calculate a proximal-distal coherence value of the target voice signal; whether the target echo loss matches with a single-talk echo state is judged; if the target echo loss matches with a single-talk echo state, the proximal-distal coherence value is recorded in status statistical data, and the statistical information is updated; the statistical information is used to update the status coefficient, and the volume control is performed on the target voice signal when the status coefficient is updated.

After acquiring a status coefficient, a target voice signal to be processed, and a derivative signal of the target voice signal, the derivative signal can be used to respectively calculate an initial echo loss corresponding to each signal frame in the target voice signal. Then, the status coefficient is used to adjust the initial echo loss to acquire a target echo loss. In order to avoid the erroneous belief that there is voice and perform the wrong tracking of the envelope in the case of single-talk echo, which further causes the volume gain adjustment to rapidly increase or decrease, thereby causing a series of low sound quality problems such as the increase of the echo, the sudden amplification or the sudden decrease of the subsequent normal local sound and the like. After judging the target echo loss and calculating the proximal-distal coherence value, it can be judged whether the target echo loss matches with a single-talk echo state. If it matches, a record is made in status statistical data, and the statistical information updated. Then the statistical information is used to update the status coefficient, and the volume control is performed on the target voice signal when updating the status coefficient.

Compared with the prior art, this device has the advantages of high environmental applicability, strong echo suppression ability, and high sound quality. Among them, the high environmental applicability refers to the fact that no matter how complex and changeable the objective factors such as reverberation, noise, and nonlinear distortion are in the conference environment, the status statistical data is used to update the status coefficient, which does not need to be limited by the theoretical values, and can more adaptively reflect the similarity of the proximal and distal signals in the case of a single-talk in the current environment; the high sound quality refers to the fact that the volume control of the target voice signal is performed when the status coefficient is updated, which can avoid the wrong tracking of the loudness envelope and the wrong adjustment of the gain when the echo is not cleared (the residual echo is slight or large) in the case of a single-talk, and the sound quality can be improved. That is to say, the device provided by the embodiment of the present application can improve the signal quality of the target voice signal after processing the target voice signal, can ensure the sound quality when the target voice signal is played, and can further improve the user experience.

In a specific embodiment of the present application, the derivative signal comprises a residual signal, an estimated echo signal, a distal reference signal and a proximal signal, correspondingly, the target echo loss acquisition module 102 is specifically used for converting the derivative signal into a frequency domain signal and calculating the autocorrelation power spectrum; wherein, the frequency domain signal comprises a residual frequency domain signal, estimated echo frequency domain signal, distal reference frequency domain signal and proximal frequency domain signal, the autocorrelation power spectrum comprises residual signal autocorrelation power spectrum, estimated echo signal autocorrelation power spectrum and distal reference signal autocorrelation power spectrum; and calculating the initial echo loss according to the frequency domain signal and the autocorrelation power spectrum.

In a specific embodiment of the present application, the target echo loss acquisition module 102 is specifically used for performing unary linear regression analysis on the residual signal and the estimated echo signal to obtain a leakage coefficient of each signal frame in the target voice signal; judging an estimated residual echo value according to a correspondence relationship between the preset leakage coefficient and the signal autocorrelation power spectrum, in combination with the signal autocorrelation power spectrum; using a residual echo suppression function to suppress a residual echo to obtain a residual echo suppression signal; and using the residual echo suppression signal and the proximal signal to determine the initial echo loss corresponding to each signal frame in the target voice signal.

In a specific embodiment of the present application, the proximal-distal coherence value recording module 105 is specifically used for using the frequency domain signal to calculate the proximal-distal coherence value within the human voice frequency range.

In a specific embodiment of the present application, the judging module 104 is specifically used for judging whether the target echo loss is less than a preset threshold; if the target echo loss is less than a preset threshold, judging the target echo loss matches the single-talk echo state; if the target echo loss is less than a preset threshold, judging the target echo loss matches the single-talk echo state.

In a specific embodiment of the present application, the proximal-distal coherence value recording module 105 is specifically used for storing the status statistical data in the form of a statistical histogram, obtaining the median value of the statistical histogram when the statistical amount in the statistical information is greater than a preset statistical threshold; using the median value to recalculate the status coefficient, and using a calculation result to update the status coefficient.

In a specific embodiment of the present application, the volume control module 106 is specifically used for calculating a transient envelope value of the target voice signal when updating the status coefficient; updating an envelope when the transient envelope value is greater than a preset noise threshold; using an updated envelope to calculate a decibel value to obtain a decibel calculation result; according to a mapping relationship between decibel and gain, judging a gain value matching the decibel calculation result, and using the gain value to control volume of the target voice signal.

Embodiment Four

Corresponding to the above method embodiments, the embodiments of the present application also provide a voice signal processing apparatus. The voice signal processing apparatus described below and the voice signal processing method described above can be referred to each other.

Figure 5:
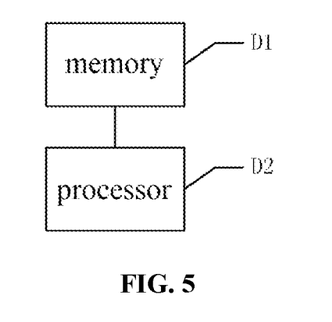
FIG. 5 is a schematic structural diagram of a voice signal processing apparatus in an embodiment of the present application.

As shown in FIG. 5, the voice signal processing apparatus comprises:
a memory D1, which is used to store a computer program;
a processor D2, which is used to perform the steps of the voice signal processing method of the foregoing method embodiment when executing a computer program.

Figure 6:
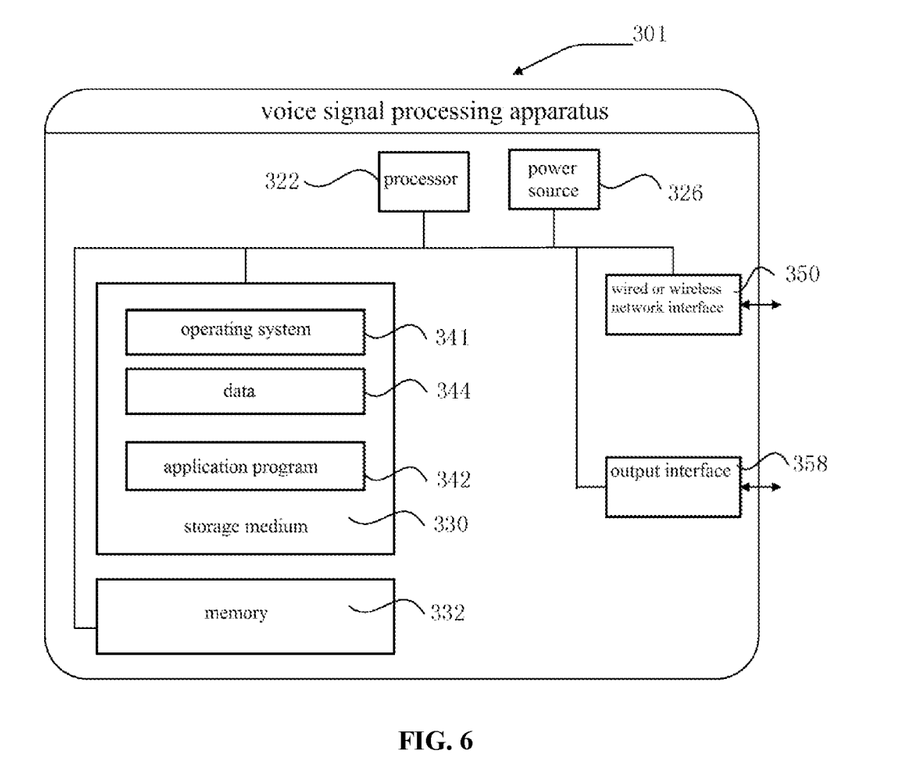
FIG. 6 is a specific schematic structural diagram of a voice signal processing apparatus in an embodiment of the present application.

Specifically, referring to FIG. 6, which is a specific schematic structural diagram of a voice signal processing apparatus in an embodiment of the present application, the voice signal processing apparatus may have relatively large differences due to different configurations or performances, and may comprise one or more central processing units (CPU) 322 (for example, one or more processors) and memories 332, one or more storage medium 330 for storing application programs 342 or data 344 (for example, one or more large amount storage apparatus). Wherein, the memory 332 and the storage medium 330 can be short-term storage or persistent storage. The program stored in the storage medium 330 may comprise one or more modules (not shown in the figure), and each module may comprise a series of instruction operations on the data processing apparatus. Furthermore, the central processing unit 322 may be configured to communicate with the storage medium 330 and execute a series of instruction operations in the storage medium 330 on the voice signal processing apparatus 301.

The voice signal processing apparatus 301 may also include one or more power sources 326, one or more wired or wireless network interfaces 350, one or more input and output interfaces 358, and/or, one or more operating systems 341. For example, Windows Server™, Mac OS X™, Unix™, Linux™, FreeBSD™ and so on.

The steps in the voice signal processing method described above can be implemented by the structure of the voice signal processing apparatus.

Embodiment 5

Corresponding to the above method embodiments, the embodiments of the present application also provide a readable storage medium, and the readable storage medium described below and the voice signal processing method described above can be referred to each other.

A readable storage medium in which the computer program is stored, and when the computer program is executed by a processor, the steps of the voice signal processing method in the above method embodiment are implemented.

The readable storage medium may specifically be various readable storage medium capable of storing program codes, such as a U disk, a mobile hard disk, a read-only memory (ROM), a random access memory (RAM), a magnetic disk, or an optical disk.

Professionals may further realize that the units and algorithm steps of the examples described in the embodiments disclosed in this article can be implemented by electronic hardware, computer software, or a combination of the two, in order to clearly illustrate the interchangeability of hardware and software, the composition and steps of each example have been described generally in terms of function in the above description. Whether these functions are executed by hardware or software depends on the specific application and design constraint conditions of the technical solution. Professionals and technicians can use different methods for each specific application to implement the described functions, but such implementation should not be considered beyond the scope of the present application.

The invention claimed is:

1. A voice signal processing method, comprising:
   acquiring a status coefficient, a target voice signal to be processed, and a derivative signal of the target voice signal;
   using the derivative signal to respectively calculate an initial echo loss corresponding to each signal frame in the target voice signal, and using the status coefficient to adjust the initial echo loss to acquire a target echo loss;
   using the derivative signal to calculate a proximal-distal coherence value of the target voice signal;
   judging whether the target echo loss matches with a single-talk echo state;
   if the target echo loss matches with a single-talk echo state, recording the proximal-distal coherence value in status statistical data, and updating statistical information;
   using the statistical information to update the status coefficient, and performing volume control on the target voice signal when updating the status coefficient.

2. The voice signal processing method according to claim 1, wherein, the derivative signal comprises a residual signal, an estimated echo signal, a distal reference signal and a proximal signal; using the derivative signal to respectively calculate an initial echo loss corresponding to each signal frame in the target voice signal comprises:
   converting the derivative signal into a frequency domain signal, and calculating an autocorrelation power spectrum; wherein, the frequency domain signal comprises a residual frequency domain signal, estimated echo frequency domain signal, distal reference frequency domain signal and proximal frequency domain signal, the autocorrelation power spectrum comprises residual signal autocorrelation power spectrum, estimated echo signal autocorrelation power spectrum and distal reference signal autocorrelation power spectrum;
   calculating the initial echo loss, according to the frequency domain signal and the autocorrelation power spectrum.

3. The voice signal processing method according to claim 2, wherein,
   using the frequency domain signal and the autocorrelation power spectrum to calculate the initial echo loss comprises:
   performing unary linear regression analysis on the residual signal and the estimated echo signal to obtain a leakage coefficient of each signal frame in the target voice signal;
   judging an estimated residual echo value, according to a preset correspondence relationship between the leakage coefficient and the signal autocorrelation power spectrum, in combination with the signal autocorrelation power spectrum;
   using a residual echo suppression function to suppress a residual echo to obtain a residual echo suppression signal;
   using the residual echo suppression signal and the proximal signal to determine the initial echo loss corresponding to each signal frame in the target voice signal.

4. The voice signal processing method according to claim 2, wherein,
   using the derivative signal to calculate a proximal-distal coherence value of the target voice signal comprises:
   in a human voice frequency range, using the frequency domain signal to calculate the proximal-distal coherence value.

5. The voice signal processing method according to claim 1, wherein, judging whether the target echo loss matches with a single-talk echo state comprises:
   judging whether the target echo loss is less than a preset threshold;
   if the target echo loss is less than a preset threshold, judging the target echo loss matches the single-talk echo state;
   if the target echo loss is not less than a preset threshold, judging the target echo loss does not match the single-talk echo state.

6. The voice signal processing method according to claim 1, wherein, when the status statistical data is stored in the form of a statistical histogram, using the statistical information to update the status coefficient comprises:
   when a statistical amount in the statistical information is greater than a preset statistical threshold, obtaining a median value of the statistical histogram;
   using the median value to recalculate the status coefficient, and using a calculation result to update the status coefficient.

7. The voice signal processing method according to claim 1, wherein, performing volume control on the target voice signal when the status coefficient is updated comprises:
   calculating a transient envelope value of the target voice signal when updating the status coefficient;
   updating an envelope when the transient envelope value is greater than a preset noise threshold;
   using an updated envelope to calculate a decibel value to obtain a decibel calculation result;

according to a mapping relationship between decibel and gain, judging a gain value matching the decibel calculation result, and using the gain value to control volume of the target voice signal.

8. A voice signal processing apparatus, comprising:
a memory, configured to store a computer program;
a processor, configured to perform the steps of the voice signal processing method according to claim 1, when the computer program is executed.

9. A non-transitory readable storage medium, characterized in that, a computer program is stored on the non-transitory readable storage medium, and when the computer program is executed by a processor, the voice signal processing method according to claim 1 is performed.

* * * * *